US009712948B2

(12) United States Patent
Blanche et al.

(10) Patent No.: US 9,712,948 B2
(45) Date of Patent: Jul. 18, 2017

(54) IMAGE TRIGGERED PAIRING

(71) Applicant: BROADCOM CORPORATION, Irvine, CA (US)

(72) Inventors: Bradley Donald Blanche, Aliso Viejo, CA (US); John Stuart Walley, Ladera Ranch, CA (US); Jeyhan Karaoguz, Irvine, CA (US); Xuemin Chen, Rancho Santa Fe, CA (US); Marcus Christopher Kellerman, Poway, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 166 days.

(21) Appl. No.: 14/321,745

(22) Filed: Jul. 1, 2014

(65) Prior Publication Data
US 2015/0319554 A1 Nov. 5, 2015

Related U.S. Application Data

(60) Provisional application No. 61/986,836, filed on Apr. 30, 2014.

(51) Int. Cl.
| | |
|---|---|
| *H04W 8/00* | (2009.01) |
| *H04W 4/00* | (2009.01) |
| *H04W 76/02* | (2009.01) |
| *G06F 3/0484* | (2013.01) |
| *H04M 1/725* | (2006.01) |

(52) U.S. Cl.
CPC ........ *H04W 4/008* (2013.01); *G06F 3/04842* (2013.01); *H04M 1/7253* (2013.01); *H04W 8/005* (2013.01); *H04W 76/023* (2013.01); *H04M 2250/52* (2013.01)

(58) Field of Classification Search
CPC ....................................... H04W 4/008
USPC .................... 455/41.1, 41.2, 41.3
See application file for complete search history.

(56) References Cited

U.S. PATENT DOCUMENTS

| | | | |
|---|---|---|---|
| 8,818,274 B2* | 8/2014 | Grob ................. | H04N 1/00127 455/41.2 |
| 2009/0156123 A1* | 6/2009 | Kim .................... | H04M 1/7253 455/41.2 |
| 2011/0151781 A1* | 6/2011 | Kainulainen ............. | G01S 3/16 455/41.2 |
| 2013/0083193 A1* | 4/2013 | Okuyama ............... | H04L 12/12 348/143 |
| 2014/0113559 A1* | 4/2014 | Cline ..................... | H04L 67/18 455/41.2 |

(Continued)

FOREIGN PATENT DOCUMENTS

| | | |
|---|---|---|
| EP | 2293531 A1 | 3/2011 |
| WO | WO-2013/154476 A1 | 10/2013 |

*Primary Examiner* — Wen Huang
(74) *Attorney, Agent, or Firm* — McDermott Will & Emery LLP

(57) ABSTRACT

An image triggered pairing system may include at least one processor circuit. The at least one processor circuit may be configured to identify a pairable device within an area. The at least one processor circuit may be further configured to determine a pairing status of the pairable device. The at least one processor circuit may be further configured to provide, for display, a graphical representation of the area and the pairable device that indicates the pairing status of the pairable device.

22 Claims, 8 Drawing Sheets

(56) References Cited

U.S. PATENT DOCUMENTS

2014/0364060 A1* 12/2014 Srivatsa ............... H04W 4/008
                                                    455/41.2
2015/0133051 A1*  5/2015 Jamal-Syed .......... H04W 8/005
                                                    455/41.2

* cited by examiner

IMAGE TRIGGERED PAIRING

CROSS-REFERENCE TO RELATED APPLICATIONS

The present application claims the benefit of U.S. Provisional Patent Application Ser. No. 61/986,836, entitled "Image Triggered Pairing," filed on Apr. 30, 2014, which is hereby incorporated by reference in its entirety for all purposes.

TECHNICAL FIELD

The present description relates generally to pairing, including image triggered pairing and image assisted pairing.

BACKGROUND

According to some estimates, more than 30 billion devices will be capable of being connected by 2020. These devices may include sensor devices, wearable devices, computing devices, and the like. The devices may be configurable to pair with one or more other devices, such as to collectively perform one or more tasks, e.g. on behalf of a user and/or an application. Thus, in any given area or network environment there may be a large number of devices that can be connected and, when connected, the devices may be configurable to perform a wide array of tasks and/or services.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

In the subject image triggered pairing system, an electronic device, such as a mobile device or a tablet device, may identify one or more pairable devices in a proximal area, such as through device sensing, image capture and processing, a known configuration of the proximal area, or user provided input and/or configuration. The electronic device may determine the pairing statuses of the identified devices with respect to the electronic device, such as whether the electronic device is paired to, and/or connected with, any of the identified devices. The electronic device may provide, for display, a graphical representation of the area and the one or more identified devices. The graphical representation may include indications of the determined pairing statuses of the one or more identified devices.

In one or more implementations, the electronic device may receive a selection of one of the devices depicted in the graphical representation, such as by a user interacting with a touchscreen upon which the graphical representation is being displayed and/or by a verbal command received from the user. In response to the selection, the electronic device may, e.g., initiate a pairing, and/or a connection, with the selected device if the electronic device is not currently paired with the selected device. Upon establishing a pairing, and/or a connection, with the device, the electronic device may receive information from the device, such as device status information, services provided by the device, capabilities of the device, etc. In one or more implementations, the electronic device may provide the device status information, and/or a list of the services provided by the device, for display, e.g. in conjunction with the graphical representation. In response to selection of one of the listed services, such as by a user interacting with a touchscreen, the electronic device may initiate the performance of the service by the device, e.g. changing the temperature of a thermostat, etc.

Figure 1:
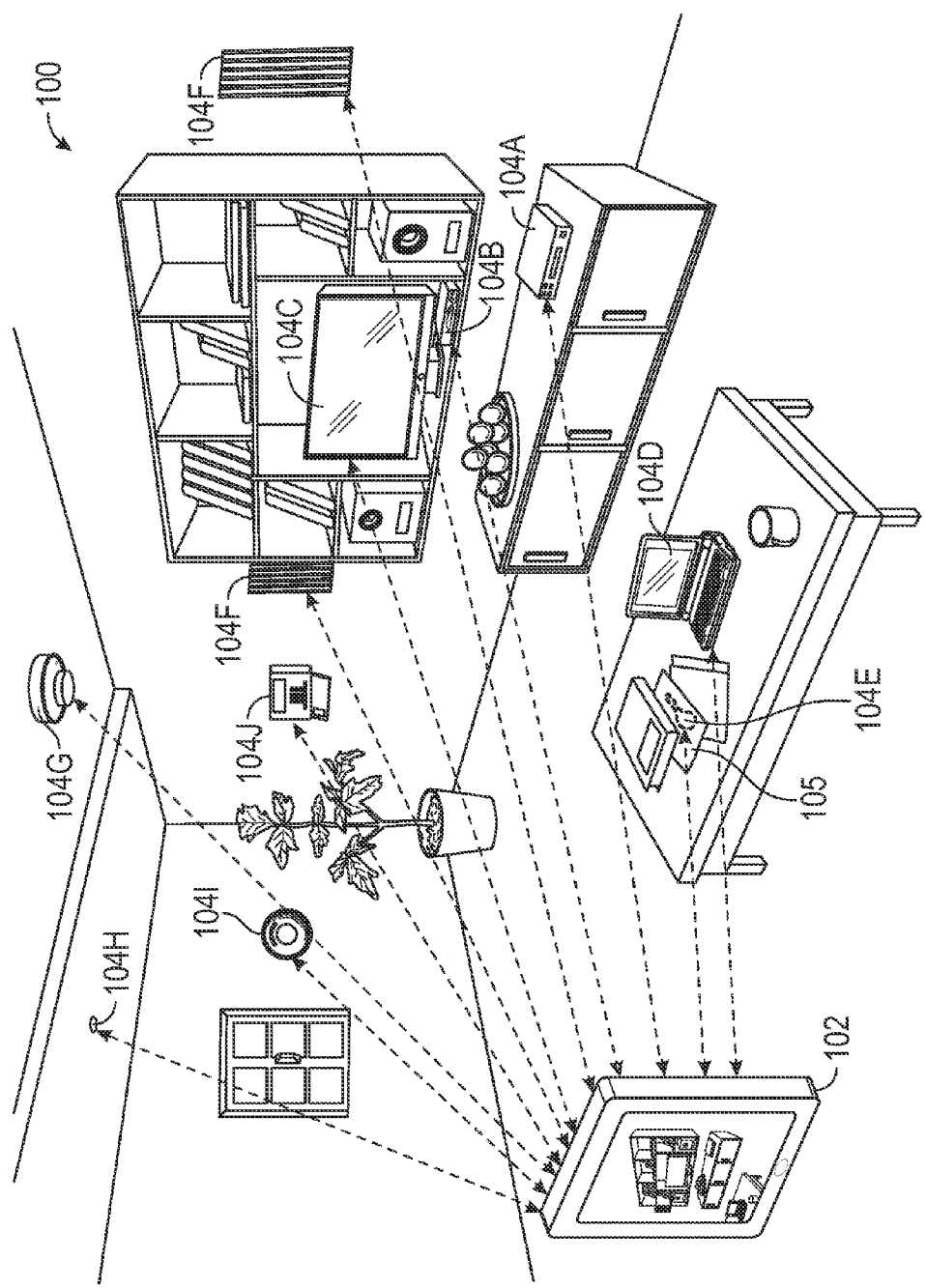
FIG. 1 illustrates an example network environment in which an image triggered pairing system may be implemented in accordance with one or more implementations.

FIG. 1 illustrates an example network environment 100 in which an image triggered pairing system may be implemented in accordance with one or more implementations. Not all of the depicted components may be used, however, and one or more implementations may include additional components not shown in the figure. Variations in the arrangement and types of the components may be made without departing from the spirit or scope of the claims as set forth herein. Additional, different or fewer components may be provided.

The example network environment 100 includes an electronic device 102 and one or more pairable devices 104A-J, which may also be referred to as connectable devices 104A-J and/or associable devices 104A-J. For explanatory purposes, the electronic device 102 is depicted in FIG. 1 as a tablet device. However, the electronic device 102 may be, for example, a smart phone device, a wearable device, such as a smart glasses device or a smart watch device, a laptop computing device, or generally any device that can pair with, and/or connect with, at least one other device. In one or more implementations, the electronic device 102 may include, and/or may be communicatively coupled to, an output device, such as a screen, and/or an image capture device, such as a camera device. An example electronic device 102 is discussed further below with reference to FIGS. 2A-B and 3.

For explanatory purposes, in FIG. 1 the pairable device 104A is depicted as a gateway device, the pairable device 104B is depicted as a set-top box device, the pairable device 104C is depicted as a television device, the pairable device 104D is depicted as a laptop device, the pairable device 104E is depicted as a smart key device, the pairable devices 104F are depicted as lighting devices, the pairable device 104G is depicted as a smoke detector device, the pairable device 104H is depicted as a motion detection device, the pairable device 104I is depicted as a thermostat device, and the pairable device 104J is depicted as a security system device. However, the pairable devices 104A-J may include any devices that can be paired with and/or connected to, such as by the electronic device 102. As shown in FIG. 1, the pairable device 104E is obscured from line of sight view in the network environment 100 by an object 105, such as a piece of paper.

The electronic device 102 and/or one or more of the pairable devices 104A-J may include one or more communication modules for establishing network connections, and/or for pairing, via one or more wired and/or wireless networking technologies. The one or more networking technologies may include, for example, Bluetooth, Zigbee, WiFi, infra-red, WiFi Direct, Ethernet, powerline, coaxial, or generally any wireless or wired communication technologies. The pairable device 104A that is a gateway device may communicatively couple the electronic device 102 and/or one or more of the pairable devices 104B-J with each other and/or with an external network, such as the Internet and/or a cloud of computing devices.

In one or more implementations, the electronic device 102 may establish direct connections, and/or may pair directly, with one or more of the pairable devices 104A-J. In one or more implementations, the electronic device 102 may establish a connection with one or more of the pairable devices 104A-J with facilitation of an intermediary, or proxy, device, such as the pairable device 104A (the gateway device). In one or more implementations, one or more of the pairable devices 104B-J, such as the pairable device 104C (the television device), may be communicatively coupled to the pairable device 104A via a wired connection, such as an Ethernet connection, and the pairable device 104A may facilitate the electronic device 102 with connecting to and/or pairing with the pairable device 104C via the wired connection. In one or more implementations, the electronic device 102 may serve as a bridge or may otherwise facilitate connecting two or more of the pairable devices 104A-J.

In one or more implementations, the electronic device 102 and/or one or more of the pairable devices 104A-J may store a list of one or more of the pairable devices 104A-J that are known or determined to be physically located in the network environment 100 along with an indication of the physical locations of the pairable devices 104A-J within the network environment 100. In one or more implementations, one or more of the pairable devices 104A-J and/or the electronic device 102 may generate and/or store a virtual map, such as three-dimensional map, of the network environment 100, for example, based at least on images captured by the electronic device 102 (or another electronic device), three-dimensional mapping data captured by the electronic device 102 (or another electronic device), and/or the indications of the physical locations of the pairable devices 104A-J within the network environment 100. The one or more pairable devices 104A-J may provide the list of the pairable devices 104A-J and/or the virtual map of the network environment 100 to the electronic device 102, such as when the electronic device 102 initially connects to one of the one or more pairable devices 104A-J.

In operation, the electronic device 102 may identify and determine pairing statuses of one or more of the pairable devices 104A-J in the network environment 100, such as by receiving signals (e.g. beacon signals) transmitted by the pairable devices 104A-J, by generating or receiving stored configuration information corresponding to the network environment 100, by receiving user input and/or configuration, and/or by capturing and/or processing an image of at least a portion of the network environment 100. The electronic device 102 may generate a graphical representation that depicts the network environment 100 (or a portion thereof) and the pairable devices 104A-J, and that indicates the pairing statuses of the pairable devices 104A-J, such as with respect to the electronic device 102. The electronic device 102 may display the graphical representation, such as on an output device.

In one or more implementations, the graphical representation may indicate that the electronic device 102 is not currently paired with one or more of the pairable devices 104A-J by including a graphical attribute, such as an outline and/or halo, proximal to and/or around the depictions of the one or more pairable devices 104A-J in the graphical representation. In one or more implementations, the graphical representation may indicate that the electronic device 102 is currently paired with and/or connected to one or more of the pairable devices 104A-J by including a different graphical attribute, such as a different colored outline and/or halo, proximal to and/or around the depictions of the one or more pairable devices 104A-J within the graphical representation. When the electronic device 102 is paired with, and/or connected to, one or more of the pairable devices 104A-J, such as the pairable device 104I, the graphical representation may also include device status information corresponding to the pairable device 104I, such as a temperature value measured by the pairable device 104I.

In one or more implementations, in response to a selection of the pairable device 104I, such as via a touch gesture associated with the graphical representation and/or via a verbal command, if the electronic device 102 is not paired and/or connected to the pairable device 104I, the electronic device 102 may initiate pairing with, and/or connecting to, the pairable device 104I. In one or more implementations, the electronic device 102 may initiate performing the pairing automatically, and/or may request confirmation that the pairing should be initiated. In one or more implementations, the electronic device 102 may display a pairing list that lists the pairable devices 104A-J that can be paired with. The electronic device 102 may initiate pairing with one of the listed pairable devices 104A-J in response to a selection thereof. In one or more implementations, the electronic device 102 may provide a room map interface that includes pins for the pairable devices 104A-J that can be paired with.

If the electronic device 102 is paired to the selected pairable device 104I, in response to the selection of the pairable device 104I, the electronic device 102 may provide, for display in conjunction with the graphical representation, a list of services that can be performed by the pairable device 104I, such as increasing or decreasing a temperature setting of the pairable device 104I, or generally any other manner in which the pairable device 104I can be controlled and/or configured. In one or more implementations, in response to a selection of one of the listed services, the electronic device 102 may initiate the performance of the service by the pairable device 104I, such as by transmitting an instruction and/or command to the pairable device 104I.

In one or more implementations, the electronic device 102 may pair together one or more of the pairable devices 104A-J that are depicted in the graphical representation, such as the pairable device 104H and the pairable device 104J, in response to selections thereof. For example, the electronic device 102 may receive a selection of the pairable device 104H immediately followed by a selection of the pairable device 104J, and/or the depiction of the pairable device 104H may be dragged across the graphical representation and dropped near the depiction of the pairable device 104J. An example process of initiating pairings with, and/or performance of services by, one or more of the pairable devices 104A-J is discussed further below with reference to FIG. 4.

In one or more implementations, the electronic device 102 may generate an image of at least a portion of the network environment 100 for display on an output device, such as a screen of the electronic device 102. For example, the electronic device 102 may capture the image using a camera device included in the electronic device 102. In one or more implementations, the generated image may be a still image, the generated image may be one or more video frames, and/or the captured image may be a combination thereof. The electronic device 102 may process the generated image to identify whether any depictions, and/or images, of the pairable devices 104A-J are included in the captured image. An example process of determining whether any pairable devices 104A-J are depicted in a generated image of an area is discussed further below with reference to FIG. 5.

In one or more implementations, the electronic device 102 may identify one or more of the pairable devices 104A-J that are not depicted in the depicted in the generated image, such as the pairable device 104E which is obscured by the object 105. The electronic device 102 may identify a signal in the network environment 100 that corresponds to the pairable device 104E, and the electronic device 102 may map a direction of the signal based at least in part on a beamforming calculation. In one or more implementations, the signal may be a tag that can be sensed by the electronic device 102 and/or that is emanating from the pairable device 104E. The electronic device 102 may correlate the direction of the signal in the network environment 100 to a relative location on the generated image. The electronic device 102 may provide an indication of the pairable device 104E, such as an outline of the pairable device 104E, at the relative location on the displayed generated image, thereby allowing a user to locate the pairable device 104E, e.g. when the pairable device 104E is obscured from view by the object 105. An example process for identifying one or more of the pairable devices 104A-J that are not depicted in a generated image of a proximal area is discussed further below with reference to FIG. 6.

In one or more implementations, the electronic device 102 may be configured to opt out of particular users and/or classes of pairable devices 104A-J. Thus, when the electronic device 102 determines which of the pairable devices 104A-J are pairable, and/or when the electronic device initiates a pairing with respect to one or more of the pairable devices 104A-J, the electronic device 102 may consider initiator inclusion/exclusion configurations and/or recipient inclusion/exclusion configurations with respect to the pairable devices 104A-J.

In one or more implementations, one or more of the pairable devices 104A-J, such as the pairable device 104J, may be associated with one or more other pairable devices 104A-J, such as the pairable device 104H. Thus, when the electronic device 102 identifies, connects, and/or pairs with the pairable device 104J, the pairable device 104J may notify the electronic device 102 of the pairable device 104H, and vice-versa. In one or more implementations, the electronic device 102 may be automatically paired with the pairable device 104H after pairing with the pairable device 104J, and vice-versa.

In one or more implementations, the electronic device 102 may use image recognition processing to identify objects, such as a hand, and movement in the vicinity of a sensing device of the electronic device 102. The electronic device 102 may then identify a ring device on the hand and may trigger a communication session with the ring device. In one or more implementations, the electronic device 102 may pair with a stove device and may display a temperature setting of the stove device, a time value indicating how much time an item in the stove device has left to cook, and/or an option to adjust the temperature of the stove device.

In one or more implementations, the electronic device 102 may display a list of the pairable devices 104I-J that are currently paired, such as in response to a request therefor. The electronic device 102 may initiate unpairing with one of the pairable devices 104I-J, in response to a request therefor and/or a selection thereof. In one or more implementations, the electronic device 102 may implement pairing limitations with respect to one or more of the pairable devices 104A-J. The pairing limitations may include, for example, time-limited access to deliver advertising, and/or for login or billing acceptance.

In one or more implementations, geolocation information and/or three-dimensional (3D) image information of paired and/or un-paired pairable devices 104A-J and/or other objects, may be delivered to the electronic device 102 via one or more mechanisms, such as via a central service exchange indexed by geolocation information, via the pairable device 104A (the gateway device), via wireless beacons and queries, and/or the like. The electronic device 102 may use the geolocation information and/or the 3D visual information to identify the pairable devices 104A-J in the network environment 100, such as based at least on one or more of field, orientation and/or geolocation information associated with the electronic device 102. Thus, if the electronic device 102 can determine where and which direction an image capture device of the electronic device 102 is facing, the electronic device 102 may be able to generate a list of and/or identify nearby and/or in view pairable devices 104A-J, such as based at least on the background of the captured image.

In one or more implementations, pairing configurations and any associated automatic or automated behaviors may be applied on a device by device and/or device/service type by type basis. In one or more implementations, a user's personal devices may be associated with a first approach, family devices may be associated with a second approach, free access points may be associated with a third approach, operator specific access points may be associated with a fourth approach, work printers may be associated with a fifth approach, workgroup phones may be associated with a sixth approach, etc. In one or more implementations, a graphical attribute, such as color (highlighting or other overlay) can be associated with each approach, such as via configuration.

Figure 2A:
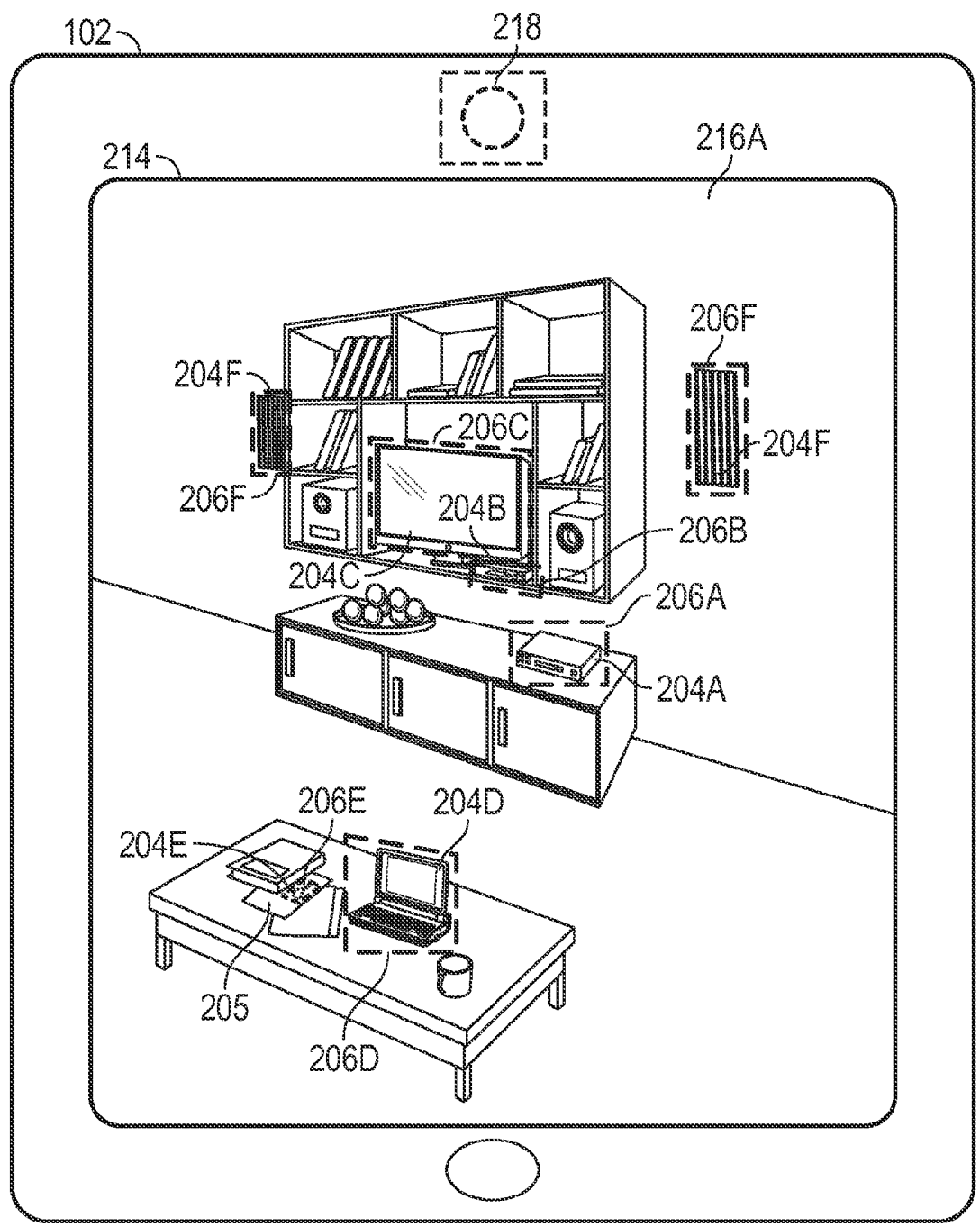
FIGS. 2A-B illustrate example electronic devices that may implement an image triggered pairing system in accordance with one or more implementations.

FIG. 2A illustrates an example electronic device 102 that may implement an image triggered pairing system in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The example electronic device 102 may include an output device 214 and an image capture device 218. The output device 214 may be, and/or may include, a screen, a display, a touchscreen, a projector, such as a prism projector that may be included in a smart glasses device, or generally any device that can output an image. The image capture device 218 may be, and/or may include, a still camera device, a video camera device, or generally any device that can capture an image.

The output device 214 may display a graphical representation 216A of an area, such as an image of a portion of the network environment 100 that is captured by the image capture device 218, a graphical representation received from another device, and/or a stored graphical representation. The graphical representation 216A may include depictions 204A-F of one or more of the pairable devices 104A-F in the network environment 100. The graphical representation 216A may include a depiction 205 of the object 105 that obscures the pairable device 104E from view. The graphical representation 216A may further include first indications 206A-F of the pairable devices 104A-F that are pairable but not currently paired with the electronic device 102. The first indications 206A-F may be displayed on the graphical representation 216A proximal to the respective depictions 204A-F of the corresponding respective pairable devices 104A-F. In one or more implementations, the first indications 206A-F may be displayed on the graphical representation 216A as overlapping, encompassing, and/or surrounding, the respective depictions 204A-F of the corresponding respective pairable devices 104A-F.

In one or more implementations, the first indications 206A-F may include a first visually distinctive graphical attribute, such as a color attribute, a shape attribute, a line attribute, such as the dashed line depicted in FIG. 2A, or generally any visually distinctive graphical attribute. In one or more implementations, the electronic device 102 may receive and/or identify a number of signals and/or beacons in a proximal area. The electronic device 102 may display an indication of the signals and/or beacons and a user may tag a portion of the graphical representation 216A to correlate the portion of the graphical representation 216A with one or more received signals and/or beacons. In one or more implementations, a tagged portion of the graphical representation 216A may correlate to one or more of the pairable devices 104A-F.

In one or more implementations, the electronic device 102 may initiate a pairing with one or more of the pairable devices 104A-F in response to a selection of one or more of the pairable devices 104A-F, such as via a movement gesture, a touch gesture, and/or via a verbal command. For example, a user may move their hand to overlap in the area of the network environment 100 shown in the graphical representation 216A to cause a representation of their hand in the graphical representation 216A to overlap with the depiction 204D of the pairable device 104D. In response to detecting the representation of the user's hand overlapping with the depiction 204D of the pairable device 104D in the graphical representation 216A for a threshold amount of time, such as one second, or generally any amount of time, the electronic device 102 may initiate pairing with the pairable device 104D.

In one or more implementations, one or more of the first indications 206A-F may be embedded in the graphical representation 216A by the electronic device 102, or may be part of one or more individually configurable layers that are applied to the graphical representation 216A by the electronic device 102. For example a first layer may include the first indications 206A-F. The electronic device 102 may provide an interface for controlling the individually configurable layers that allows a user to separately toggle the display of the layers.

In one or more implementations, a pairable device 104E may not be visible in the graphical representation 216A, but the electronic device 102 may still detect its presence and location so that it is able to generate a depiction 204E of the pairable device 104E in the graphical representation 216A, such as the outline of the shape of the pairable device 104E depicted in FIG. 2A. The depiction 204E of the pairable device 104E may be located at the relative location within the graphical representation 216A that correlates to the estimated physical location of the pairable device 104E within the network environment 100, such as overlaying the depiction 205 that corresponds to the obscuring object 105. Thus, a user viewing the graphical representation 216A may be able to physically locate the pairable device 104E in the network environment 100 based at least in part on the relative location of the depiction 204E of the pairable device 104E within the graphical representation 216A, even when the pairable device 104E is obscured from line of sight view in the network environment 100.

In one or more implementations, one or more graphical attributes, such as color, line type, etc., of the first indications 206A-F may be coded based at least on one or more of device type, connection type, connectivity parameters, configurations, inclusion/exclusion settings, etc. In one or more implementations, each of the first indications 206A-F may include at least one unique graphical attribute, such as color, line type, etc. The pairable devices 104A-F may then be referenced based at least on the unique graphical attributes of the corresponding first indications 206A-F. For example, a user may look at a pairable device 104A for which the unique attribute of the first indication 206A is the color blue, and the user may issue a verbal command of "pair it" or "pair blue," to initiate pairing with the pairable device 104A.

In one or more implementations, the electronic device 102 may be configurable to provide less functionality, not pair and/or ignore one or more of the pairable devices 104A-F, such as one or more of the pairable devices 104A-F that are inaccessible, have no account, are private, are not free, have limited or no connectivity, are being shared, etc. In one or more implementations, the electronic device 102 may be configurable to ignore one or more of the pairable devices 104A-F based at least on device type and/or service type. The electronic device 102 may not provide the first indications 206A-F and/or any other indications for the one or more pairable devices 104A-F that are being ignored.

Figure 2B:
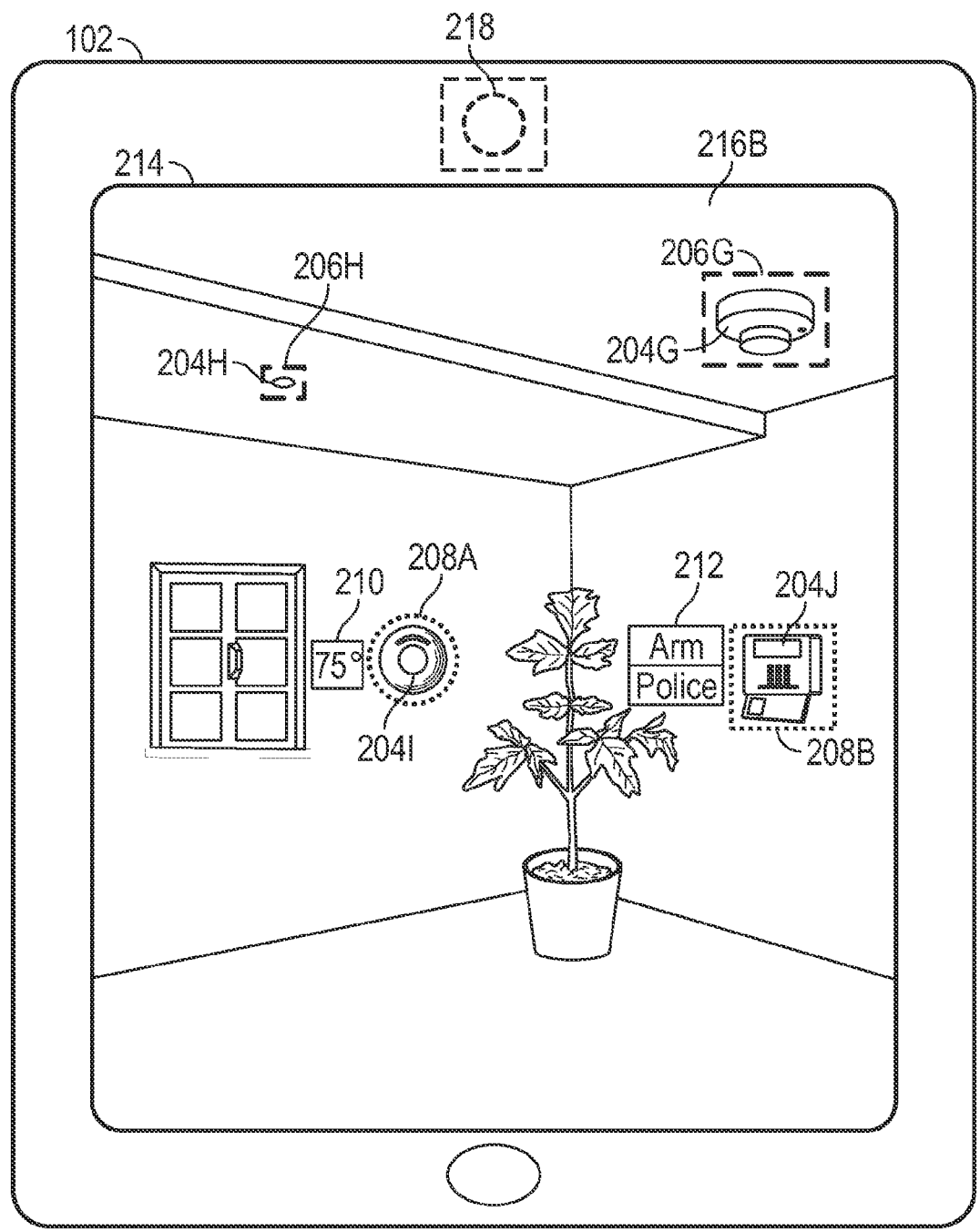

FIG. 2B illustrates an example electronic device 102 that may implement an image triggered pairing system in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The example electronic device 102 may include the output device 214 and the image capture device 218. The output device 214 may display a graphical representation 216B of an area, such as an image of an area of the network environment 100 that is captured by the image capture device 218, a graphical representation received from another device, and/or a stored graphical representation. As shown in FIG. 2B, the graphical representation 216B depicts a different perspective of the network environment 100 than the graphical representation 216A of FIG. 2A.

The graphical representation 216B may include depictions 204G-J of one or more of the pairable devices 104G-J in the network environment 100. The graphical representation 216B may further include first indications 206G-H of the pairable devices 104G-H that are pairable but not currently paired with the electronic device 102, and second indications 208A-B of the pairable devices 104I-J that the electronic device 102 is currently paired with. The first indications 206G-H and the second indications 208A-B may be displayed on the graphical representation 216B proximal to the respective depictions 204G-J of the corresponding respective pairable devices 104G-J. In one or more implementations, the first indications 206G-H and the second indications 208A-B may be displayed on the graphical representation 216B as overlapping, encompassing, and/or surrounding, the respective depictions 206G-J of the corresponding respective pairable devices 104G-J.

In one or more implementations, the first indications 206G-H may include a first visually distinctive graphical attribute, such as a color attribute, a shape attribute, a line attribute, such as the dashed line depicted in FIG. 2B, or generally any visually distinctive graphical attribute. In one or more implementations, the second indications 208A-B may include a second visually distinctive graphical attribute that is different than the first visually distinctive graphical attribute, such as a color attribute, a shape attribute, a line attribute, such as the dotted line depicted in FIG. 2B, or generally any visually distinctive graphical attribute.

With respect to the pairable devices 104I-J that the electronic device 102 is currently paired with, the graphical representation 216B may include status information 210 corresponding to the pairable device 104I and a list of services 212 that correspond to the pairable device 104J. The status information 210 may be displayed on the graphical representation 216B proximal to the depiction 204I of the corresponding pairable device 104I. For explanatory purposes, the pairable device 104I is depicted in FIG. 1 as a thermostat device, and the status information 210 for the pairable device 104I is depicted in FIG. 2 as a temperature value, such as a temperature value measured by the pairable device 104I and/or by a device coupled thereto.

In one or more implementations, the status information 210 may be, and/or may include, any information corresponding to the pairable device 104I, such as pairing status, e.g., currently unavailable, paired, available, model/capabilities of the pairable device 104I, whether the pairable device 104I is publicly or privately accessible, connectivity of the pairable device 104I, such as link capabilities, quality of service (QoS) and/or status, a security level associated with the pairable device 104I, one or more payment requirements associated with the pairable device 104I, shared use statistics associated with the pairable device 104I, and/or any other such information.

The list of services 212 may be displayed on the graphical representation 216B proximal to the depiction 204J of the corresponding pairable device 104J. In one or more implementations, the electronic device 102 may display the list of services 212, in response to a selection of the pairable device 104J, such as by a movement gesture, a touch gesture, and/or a verbal command. For explanatory purposes, the pairable device 104J is depicted in FIG. 1 as a security system device, and the list of services 212 for the pairable device 104I is depicted in FIG. 2B as including a security system arming service, and a police notification service. In one or more implementations, the list of services 212 may generally include any manner in which the pairable device 104I can be controlled and/or configured by the electronic device 102, such as unpairing, powering off, entering a low power mode, configuring a security level, view status/settings, view available services and fees, etc. In one or more implementations, the electronic device 102 may initiate a performance of one of the services listed in the list of services 212, in response to a selection thereof, such as by a movement gesture, a touch gesture, and/or a verbal command.

Thus, as shown in FIG. 2B, the electronic device 102 is currently paired to the pairable devices 104I-J, as indicated by the second indications 208A-B, and the pairable devices 104G-H are available for pairing with the electronic device 102, as indicated by the first indications 206G-H. In one or more implementations, one or more of the first indications 206G-H, the second indications 208A-B, the status information 210, and/or the list of services 212 may be embedded in the graphical representation 216B by the electronic device 102, or may be part of one or more individually configurable layers that are applied to the graphical representation 216B by the electronic device 102. For example a first layer may include the first indications 206G-H, a second layer may include the second indications 208A-B, and a third layer may include the status information 210 and/or the list of services 212. The electronic device 102 may provide an interface for controlling the individually configurable layers that allows a user to separately toggle the display of the layers.

In one or more implementations, the first indications 206G-H and/or the second indications 208A-B may be applied to one or more pairable devices 104G-J that are not physically visible in the graphical representation 216B. Thus, if the pairable device 104J (the security system device) was located behind the tree, or was otherwise not visible, the electronic device 102 may still pair with the pairable device 104J and/or access one or more services provided by the pairable device 104J.

In one or more implementations, one or more graphical attributes, such as color, line type, etc., of the first indications 206G-H, the second indications 208A-B, and/or any other indications, may be coded based at least on one or more of device type, connection type, connectivity parameters, configurations, inclusion/exclusion settings, etc. In one or more implementations, each of the first indications 206G-H and/or the second indications 208A-B may include at least one unique graphical attribute, such as color, line type, etc.

In one or more implementations, the electronic device 102 may identify the pairable devices 104G-J from an image or frame of a video stream of the area that is being continuously captured by the electronic device 102, such as via the image capture device 218. After identifying the pairable devices 104G-J within the image of the video stream, the electronic device 102 may continuously track the locations of the pairable devices 104G-J within the images and/or video frames of the video stream as successive images and/or video frames are received. In this manner, the electronic device 102 may continuously include the first indications 206G-H and/or the second indications 208A-B in the graphical representation 216B proximal to the depictions 204G-J of the corresponding pairable devices 104G-J. Furthermore, the electronic device 102 may be able to track the pairable devices 104G-J when the angle or view of the proximal area that is captured by the image capture device 218 changes.

Figure 3:
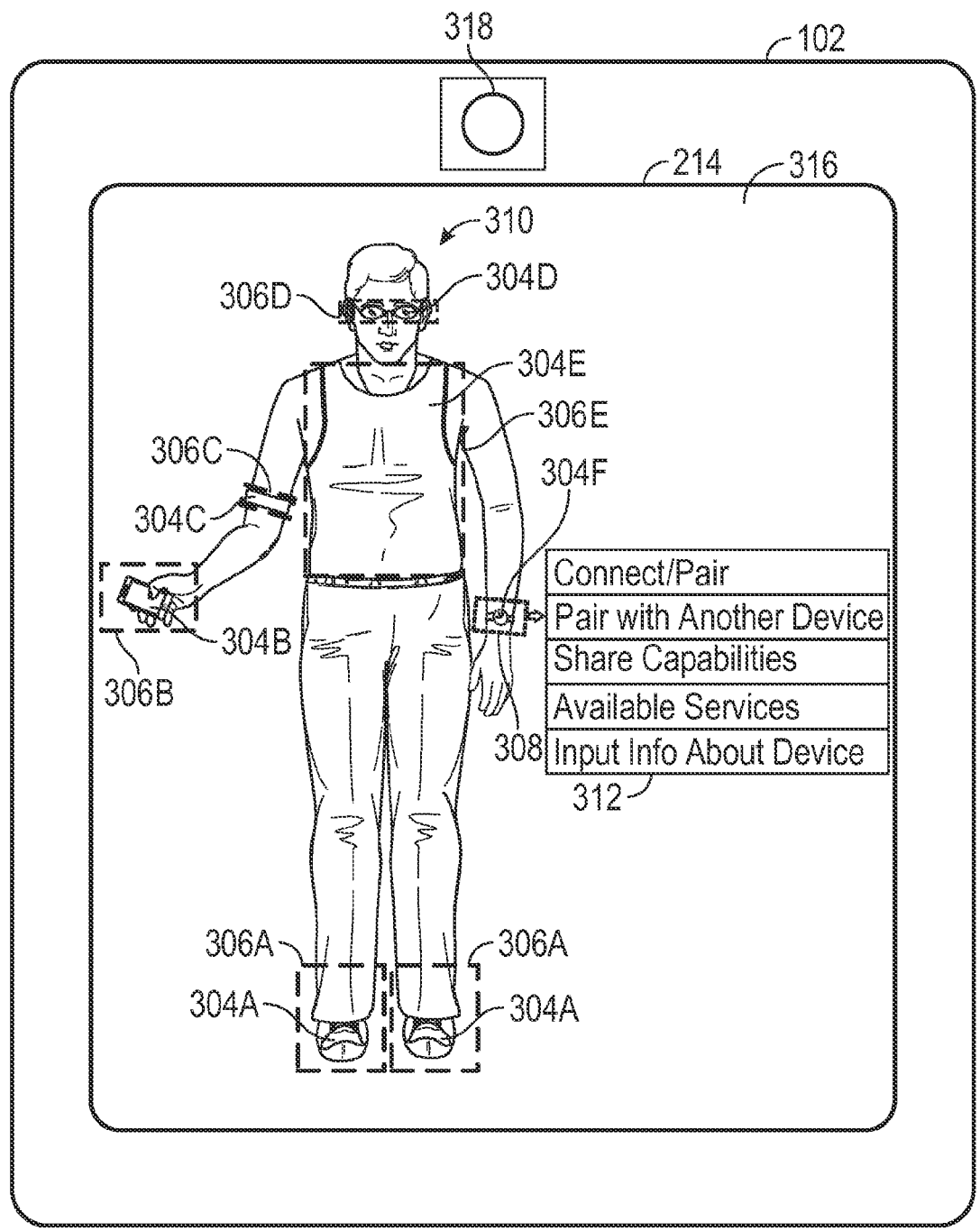
FIG. 3 illustrates an example electronic device that may implement an image triggered pairing system in accordance with one or more implementations.

FIG. 3 illustrates an example electronic device 102 that may implement an image triggered pairing system in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The example electronic device 102 may include the output device 214 and a front-facing image capture device 318. The output device 214 may display a graphical representation 316 of an area, such as a graphical representation 316 of the area around and including a body 310 of the user. In one or more implementations, the graphical representation 316 may be captured by the front-facing image capture device 318, and/or the graphical representation 316 may be a virtual representation of the body 310 of the user, such as a generated and/or retrieved graphical representation 316 of the body 310 of the user.

The graphical representation 316 may include depictions 304A-F of one or more pairable devices, such as pairable devices that are worn by, and/or proximal to, the user. For explanatory purposes, in FIG. 3 the depiction 304A corresponds to smart shoe devices, the depiction 304B corresponds to a smart phone device, the depiction 304C corresponds to a smart monitor device, the depiction 304D corresponds to a smart glasses device, the depiction 304E corresponds to a smart clothing device, and the depiction 304F corresponds to a smart watch device. The graphical representation 316 may further include first indications 306A-E of the pairable devices that are pairable but not currently paired with the electronic device 102, and a second indication 308 of the pairable devices that the electronic device 102 is currently paired with. The first indications 306A-E and the second indication 308 may be displayed on the graphical representation 316 proximal to the respective depictions 304A-F of the corresponding respective pairable devices. In one or more implementations, the first indications 306A-E and the second indication 308 may be displayed on the graphical representation 316 as overlapping, encompassing, and/or surrounding, the respective depictions 304A-F of the corresponding respective pairable devices.

The graphical representation 316 may further include a list of services 312 that may be displayed on the graphical representation 316 proximal to the depiction 304F of the corresponding pairable device. In one or more implementations, the electronic device 102 may display the list of services 312 in response to a selection of the pairable device corresponding to the depiction 304F. As shown in FIG. 3, in one or more implementations the list of services 312 may include connecting and/or pairing with the pairable device, pairing the pairable device with another pairable device, sharing the capabilities of the pairable device, display the available services provided by the pairable device, and/or input information about the pairable device, such as by a user interacting with the electronic device 102.

Figure 4:
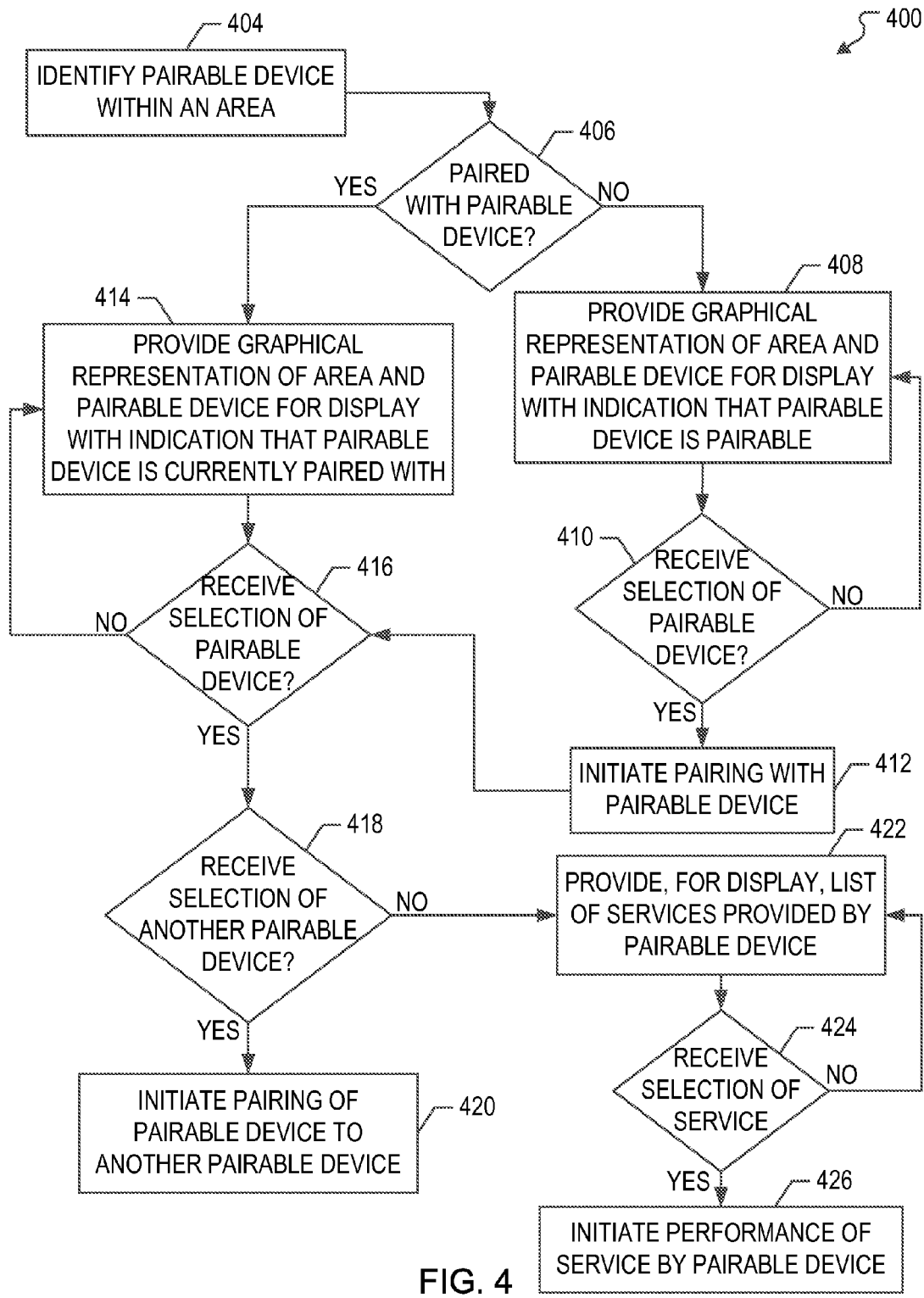
FIG. 4 illustrates a flow diagram of an example process of an image triggered pairing system in accordance with one or more implementations.

FIG. 4 illustrates a flow diagram of an example process 400 of an image triggered pairing system in accordance with one or more implementations. For explanatory purposes, the example process 400 is primarily described herein with reference to the electronic device 102 of FIGS. 1 and 2; however, the example process 400 is not limited to the electronic device 102 of FIGS. 1 and 2. In one or more implementations, one or more blocks of the example process 400 may be performed by, and/or may be facilitated by, one or more proximal and/or remote devices that are communicatively coupled to the electronic device 102, such as a cloud of computing devices. Further for explanatory purposes, the blocks of the example process 400 are described herein as occurring in serial, or linearly. However, multiple blocks of the example process 400 may occur in parallel. In addition, the blocks of the example process 400 may be performed a different order than the order shown and/or one or more of the blocks of the example process 400 may not be performed.

The electronic device 102 identifies a pairable device within an area (404), such as the network environment 100. The electronic device 102 determines whether the identified pairable device is paired with, and/or connected to, the electronic device 102 (406). For example, the electronic device 102 may compare an identifier, such as an address, associated with the pairable device to a list of identifiers and/or addresses of devices that the electronic device 102 is presently paired with, and/or connected to.

If the electronic device 102 is not currently paired with the identified pairable device, such as the pairable device 104A (406), the electronic device 102 provides a graphical representation 216A of the area and the pairable device 104A for display with an indication that the pairable device 104A is pairable and not currently paired with the electronic device 102 (408). In one or more implementations, the electronic device 102 may display the graphical representation 216A with the first indication 206A via the output device 214.

In one or more implementations, when the pairable device 104A is identified (404) from an image captured by the image capture device 218, and the graphical representation 216A is generated from the captured image, one or more blocks of the process 400 may be performed in substantially real-time, and/or in parallel, such that there is minimal or no latency between identifying the pairable device 104A (404) and providing the graphical representation 216A for display with the first indication 206A that the pairable device 104A is pairable and not currently paired with the electronic device 102 (408).

If the electronic device 102 receives a selection of the pairable device 104A (410), such as via a touch gesture and/or via a verbal command, the electronic device 102 may initiate pairing with the pairable device 104A (412). In one or more implementations, the selection of the pairable device 104A may be and/or may include a request to pair the electronic device 102 with the pairable device 104A. In one or more implementations, after pairing with the pairable device 104A, the electronic device 102 may provide, for display in conjunction with the graphical representation 216A, any status information 210 obtainable from the pairable device 104A.

If the electronic device 102 determines that the electronic device 102 is currently paired with the identified pairable device, such as the pairable device 104J (406), the electronic device 102 provides for display a graphical representation 216B of the area and the pairable device 104J that indicates that the pairable device 104J is currently paired with the electronic device 102 (414). In one or more implementations, the electronic device 102 may display the graphical representation 216B with the second indication 208B via the output device 214.

In one or more implementations, when the pairable device 104J is identified (404) from an image captured by the image capture device 218, and the graphical representation 216B is generated from the captured image, one or more blocks of the process 400 may be performed in substantially real-time, and/or in parallel, such that there is minimal or no latency between identifying the pairable device 104J (404) and providing the graphical representation 216B for display with the second indication 208B that the pairable device 104J is currently paired with the electronic device 102 (414).

If the electronic device 102 receives a selection of the pairable device 104J (416), such as via a touch gesture and/or via a verbal command, the electronic device 102 may determine whether a second pairable device, such as the pairable device 104I, was subsequently selected and/or was selected in combination with the pairable device 104J (418). In one or more implementations, the pairable devices 104I-J may be selected in combination via a command to pair the pairable devices 104I-J to one another, such as in the form of a verbal command.

If a second pairable device, such as the pairable device 104I, was subsequently selected (418), the electronic device 102 may initiate pairing the pairable device 104I to the pairable device 104J (420). In one or more implementations, the electronic device 102 may transmit a pairing command to the pairable device 104I and/or the pairable device 104J, along with an indication, such as an identifier and/or address, of the other pairable device 104J and/or the other pairable device 104I, respectively. In one or more implementations, the electronic device 102 may not be paired with either of the pairable devices 104I-J when the electronic device 102 initiates the pairing of the pairable devices 104I-J (420).

If a second pairable device was not subsequently selected and/or selected in combination with the pairable device 104J (418), the electronic device 102 provides, for display in conjunction with the graphical representation 216B, a list of services 212 that are provided by the pairable device 104J. In one or more implementations, the electronic device 102 may also provide any available status information 210 obtainable from the pairable device 104J for display with the list of services 212. If the electronic device 102 does not receive a selection of one of the listed services (424), the electronic device 102 may continue to provide the list of services for display (422), and/or may continue to perform one or more other blocks (402)-(420). If the electronic device 102 receives a selection of one of the listed services (424), the electronic device 102 may initiate performance of the selected service by the pairable device 104J (426). In one or more implementations, the electronic device 102 may transmit a signal to the pairable device 104J, directly or via an intermediary device, that includes a command and/or instruction to perform the requested service.

Figure 5:
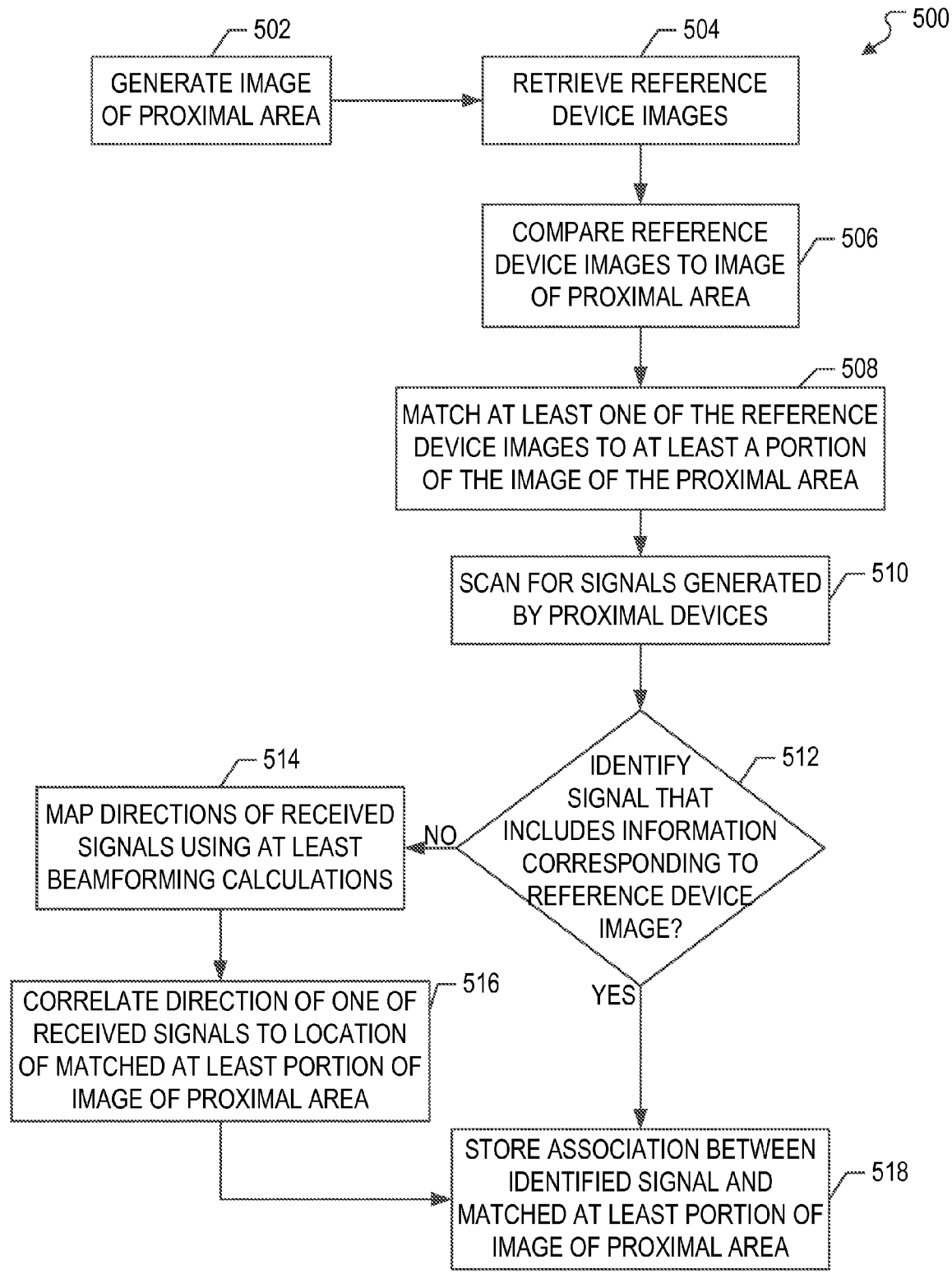
FIG. 5 illustrates a flow diagram of an example process of an image triggered pairing system in accordance with one or more implementations.

FIG. 5 illustrates a flow diagram of an example process 500 of an image triggered pairing system in accordance with one or more implementations. For explanatory purposes, the example process 500 is primarily described herein with reference to the electronic device 102 of FIGS. 1 and 2; however, the example process 500 is not limited to the electronic device 102 of FIGS. 1 and 2. In one or more implementations, one or more blocks of the example process 500 may be performed by, and/or may be facilitated by, one or more proximal and/or remote devices that are communicatively coupled to the electronic device 102, such as a cloud of computing devices. Further for explanatory purposes, the blocks of the example process 500 are described herein as occurring in serial, or linearly. However, multiple blocks of the example process 500 may occur in parallel. In addition, the blocks of the example process 500 may be performed a different order than the order shown and/or one or more of the blocks of the example process 500 may not be performed.

The electronic device 102 generates an image of a proximal area (502), such as by capturing an image and/or video frame of the network environment 100 using the image capture device 218, receiving a stored graphical representation of the proximal area, sensing a device environment, or any other technique described herein. In one or more implementations, one or more of the graphical representations 216A-B, 316 may be generated from, and/or may include all or part of, the generated image. The electronic device 102 retrieves reference device images, such as from a memory and/or from one or more communicably coupled devices, e.g. a cloud of computing devices (504). The reference device images may be reference images of devices that may be located within the proximal area. In one or more implementations, the reference device images may be provided by the manufacturers of the devices. In one or more implementations, the reference device images may include multiple views of one or more of the devices and/or may include three-dimensional models of one or more of the devices. In one or more implementations, one or more of the reference device images may be and/or may include a fingerprint and/or a signature of the reference device image, e.g. in lieu of and/or in addition to the entire reference device image.

In one or more implementations, the electronic device 102 may analyze the image of the proximal area to categorize and/or classify the proximal area. The area may be categorized and/or classified, for example, as a home, an office, a public area, a vehicle (e.g. inside a vehicle), and/or more particularly, as a type of room, such as a bedroom, a kitchen, a living room, etc. The electronic device 102 may then retrieve a library of reference device images (504) that is associated with the categorization and/or classification of the proximal area.

In one or more implementations, the electronic device 102 may receive a categorization and/or classification of the area, and/or the library of reference images, from a gateway device, such as the pairable device 104A. The gateway device may store categorizations and/or classifications of areas, such as classifications previously made by the electronic device 102 and/or other electronic devices, and the gateway device may provide the categorization and/or classification of the proximal area to the electronic device 102, such as based at least in part on a location of the electronic device 102 and/or a direction in which the image capture device 218 of the electronic device 102 is facing.

In one or more implementations, the library of reference device images associated with a categorization and/or classification of an area may contain reference device images of devices that are typically located in, and/or associated with, the categorization and/or classification of the area. For example, a library of reference device images that is associated with an area that is categorized and/or classified as a kitchen may include images of kitchen devices, such as refrigerators, dishwashers, ovens, etc. Similarly, a library of reference device images that is associated with an area that is categorized and/or classified as a living room may include reference device images of televisions, set-top box devices, remote control devices, etc.

The electronic device 102 compares the reference device images, and/or the fingerprints or signatures thereof, to the image of the proximal area (506). For example, the electronic device 102 may use one or more of an image search algorithm, an image matching algorithm, a pattern matching algorithm, and/or generally any algorithm to compare the reference device images to the graphical representation 216A of the proximal area (506). The electronic device 102 matches at least one of the reference device images to at least a portion of the image of the proximal area, such as to the depiction 204A of the pairable device 104A (508). In one or more implementations, the reference device image may include a device identifier that is associated with the pairable device 104A that the reference device image corresponds to.

The electronic device 102 scans for signals generated by proximal devices, such as signals generated by the pairable devices 104A-J (510). In one or more implementations, the electronic device 102 may scan for pilot signals, advertiser signals, beacon signals, or generally any transmitted signals that can be discovered and/or detected by the electronic device 102. In one or more implementations, one or more of the pairable devices 104A-J, such as the pairable device 104A, may transmit signals that include information that identifies the pairable device 104A, such as an address of the pairable device 104A, an identifier of the pairable device 104A, the depiction 204A of the pairable device 104A, a location of the pairable device 104A, or generally any information pertaining to the pairable device 104A. In one or more implementations, the electronic device 102 may display a list of the scanned signals and a graphical representation 216A of the area. A user may associate one or more of the scanned signals with one or more of the pairable devices 104A-F depicted in the graphical representation 216A, such as by dragging a signal from the list to one of the depictions 204A-F of one of the pairable devices 104A-F.

If the electronic device 102 identifies a received signal that includes information that corresponds to the matched reference device image (512), such as a signal that includes a device identifier that coincides with the device identifier of the matched reference device image and/or a signal that includes a copy of the matched reference device image, the electronic device 102 stores an association between the identified signal and the at least the portion of the image of the proximal area that matches the reference device image, such as the depiction 204A (518). In one or more implementations, the electronic device 102 may store any information regarding the corresponding pairable device 104A that is determinable from the signal, such as an address of the pairable device 104A, a location of the pairable device 104A, or generally any information regarding the pairable device 104A. The electronic device 102 may subsequently access the stored association between the identified signal and the depiction 204A to facilitate initiating pairing with the pairable device 104A, initiating services performed by the pairable device 104A, etc.

If the electronic device 102 does not identify a signal that includes information that corresponds to the matched reference device image (512), the electronic device 102 maps directions of received signals using at least beamforming calculations (514). In one or more implementations, the electronic device 102 may include an antenna array, such as for determining the angle of arrival and/or direction of arrival of received signals. The electronic device 102 correlates the direction of one of the received signals in the proximal area to a relative location of the at least the portion of the image of the proximal area that matches the reference device image (516). The electronic device 102 then stores an association between the identified signal and the at least the portion of the image that matches the reference device image (518). In one or more implementations, the electronic device 102 may store any information regarding the pairable device 104A that is determinable from the identified signal. The electronic device 102 may subsequently access the stored association between the identified signal and the at least the portion of the image to initiate pairing with the corresponding pairable device 104A, initiating services performed by the pairable device 104A, etc.

Figure 6:
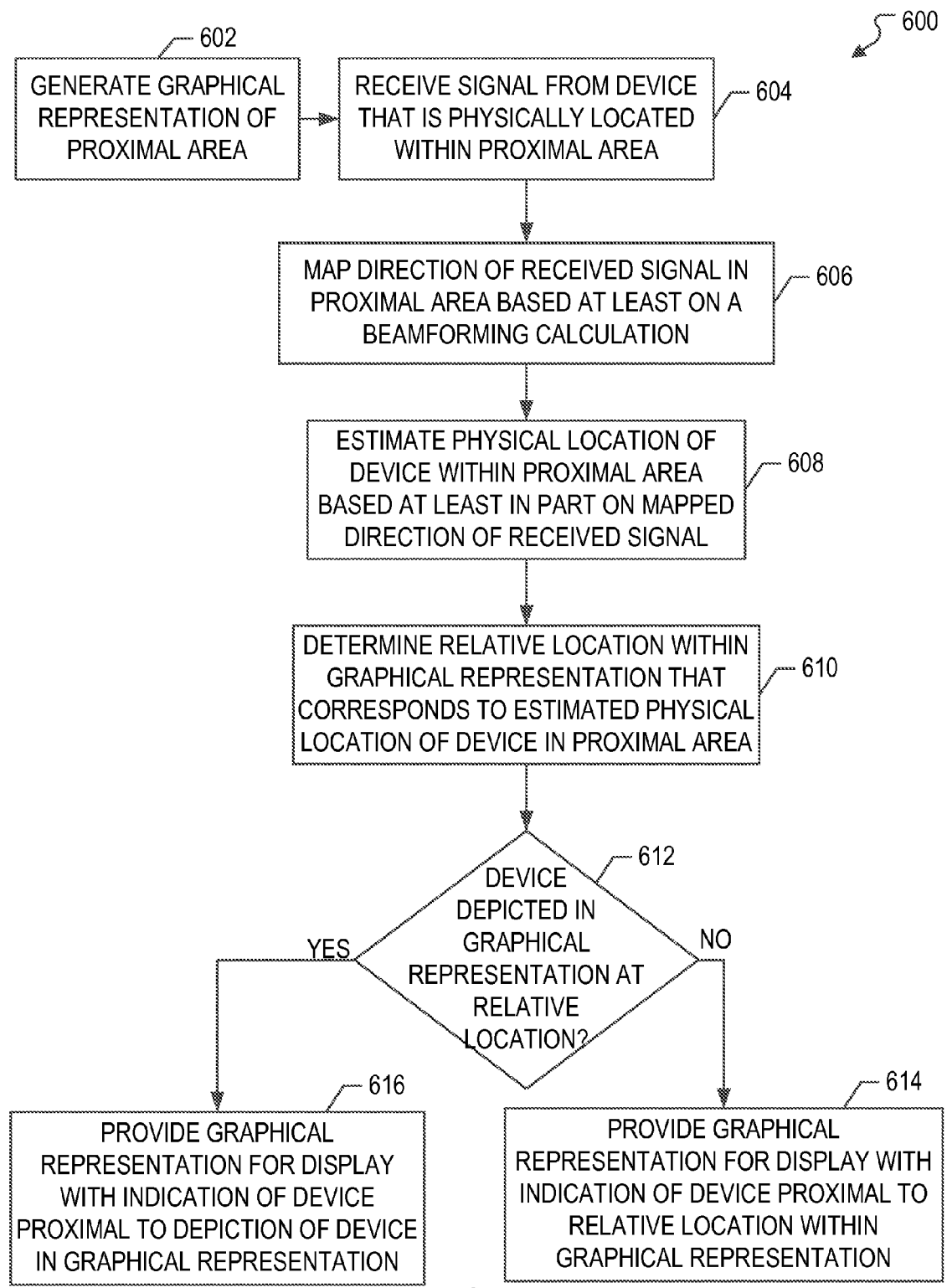
FIG. 6 illustrates a flow diagram of an example process of an image triggered pairing system in accordance with one or more implementations.

FIG. 6 illustrates a flow diagram of an example process 600 of an image triggered pairing system in accordance with one or more implementations. For explanatory purposes, the example process 600 is primarily described herein with reference to the electronic device 102 of FIGS. 1 and 2; however, the example process 600 is not limited to the electronic device 102 of FIGS. 1 and 2. In one or more implementations, one or more blocks of the example process 600 may be performed by, and/or may be facilitated by, one or more proximal and/or remote devices that are communicatively coupled to the electronic device 102, such as a cloud of computing devices. Further for explanatory purposes, the blocks of the example process 600 are described herein as occurring in serial, or linearly. However, multiple blocks of the example process 600 may occur in parallel. In addition, the blocks of the example process 600 may be performed a different order than the order shown and/or one or more of the blocks of the example process 600 may not be performed.

The electronic device 102 generates a graphical representation 216A of a proximal area, such as by capturing an image and/or video frame of the network environment 100 using the image capture device 218 (602), receiving a stored graphical representation of the proximal area, sensing a device environment, or any other technique described herein. The electronic device 102 receives a signal from a device, such as a pairable device 104E or a non-pairable device, that is physically located within the proximal area (604). In one or more implementations, the electronic device 102 may receive a pilot signal, a beacon signal, or generally any signal that may be transmitted by the pairable device 104E. The electronic device 102 maps a direction of the received signal in the proximal area based at least on a beamforming calculation (606). In one or more implementations, the electronic device 102 may include an antenna array for determining the angle of arrival and/or direction of arrival of the received signal.

The electronic device 102 estimates a physical location of the pairable device 104E within the proximal area based at least in part on the mapped direction of the received signal (608). In one or more implementations, the electronic device 102 may determine, based at least in part on the mapped direction of the received signal, and/or a signal strength of the received signal, an estimated physical location of the pairable device 104E in the proximal area.

The electronic device 102 determines a relative location within the graphical representation 216A that corresponds to the estimated physical location of the pairable device 104E in the proximal area (610). In one or more implementations, the electronic device 102 may use information received from one or more sensors of the electronic device 102, such as a gyroscope, compass, accelerometer, etc. to determine the direction that the image capture device 218 of the electronic device 102 is facing relative to the mapped direction of the received signal. The electronic device 102 determines whether one of the pairable devices 104A-F is depicted in the graphical representation 216A at the determined relative location (612). In one or more implementations, the electronic device 102 may compare the reference device images to the determined relative location within the graphical representation 216A to determine whether one of the pairable devices 104A-F is depicted in the graphical representation 216A at the relative location. In one or more implementations, the received signal may include information that can be used to select one or more reference device images for comparison, such as a device identifier.

If the electronic device 102 is unable to identify one of the depictions 204A-F at the relative location within the graphical representation 216A, the electronic device 102 provides the graphical representation 216A for display with an indication of the pairable device 104E proximal to the relative location within the graphical representation 216A, such as overlapping and/or overlaid on top of, the relative location (614). In one or more implementations, the indication may be the virtual depiction 204E and/or the first indication 206E that were previously discussed with reference to FIG. 2A. Thus, even though the pairable device 104E is not visible in the graphical representation 216A, the virtual depiction 204E is displayed with the graphical representation 216A, thereby providing a user with an indication of a location of the pairable device 104E, and the first indication 206E is displayed, thereby notifying the user that the pairable device 104E may be paired with.

If the electronic device 102 determines that the pairable device 104E is depicted in the graphical representation 216A at the relative location (612), the electronic device 102 provides the graphical representation 216A for display with an indication of the pairable device 104E located proximal to the depiction of the pairable device 104E in the graphical representation 216A (616). In one or more implementations, the indication may be the first indication 206E that was previously discussed with reference to FIG. 2A.

Figure 7:
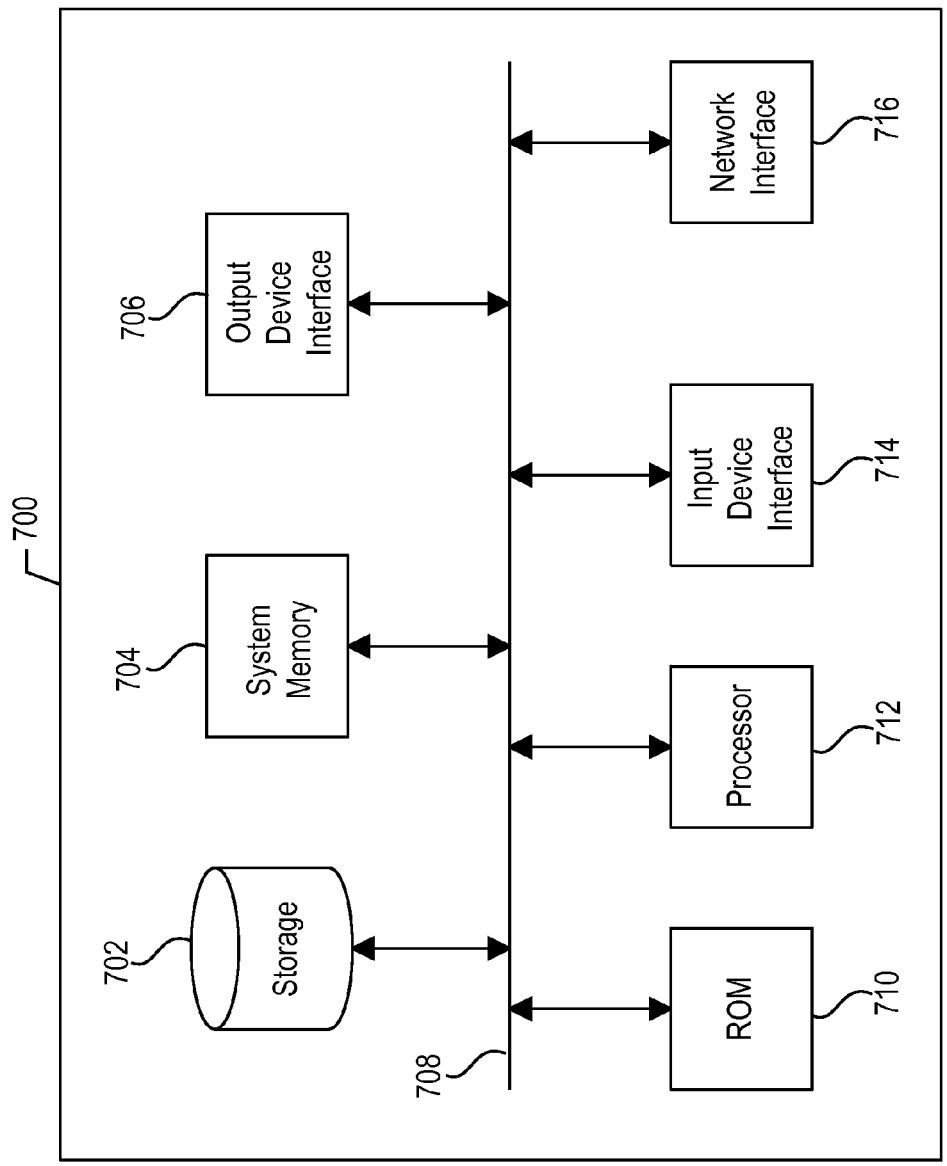
FIG. 7 conceptually illustrates an example electronic system with which one or more implementations of the subject technology can be implemented.

FIG. 7 conceptually illustrates an example electronic system 700 with which one or more implementations of the subject technology can be implemented. The electronic system 700, for example, may be, or may include, one or more wearable devices, such as one or more of the pairable devices 104A-J, the electronic device 102, one or more devices communicably coupled to the electronic device 102, such as a cloud of computing devices, a desktop computer, a laptop computer, a tablet computer, a phone, and/or generally any electronic device. Such an electronic system 700 includes various types of computer readable media and interfaces for various other types of computer readable media. The electronic system 700 includes a bus 708, one or more processing unit(s) 712, a system memory 704, a read-only memory (ROM) 710, a permanent storage device 702, an input device interface 714, an output device interface 706, one or more network interface(s) 716, and/or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are utilized by the one or more processing unit(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory (RAM). The system memory 704 may store one or more of the instructions and/or data that the one or more processing unit(s) 712 may utilize at runtime. In one or more implementations, the processes of the subject disclosure are stored in the system memory 704, the permanent storage device 702, and/or the ROM 710. From these various memory units, the one or more processing unit(s) 712 retrieve instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, image capture devices, such as still camera devices and/or video camera devices, alphanumeric keyboards, and/or pointing devices (also called "cursor control devices"). The output device interface 706 may enable, for example, the display of images generated by the electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 7, bus 708 also couples electronic system 700 to one or more networks (not shown) through one or more network interface(s) 716. The one or more network interface(s) may include an Ethernet interface, a WiFi interface, a multimedia over coax alliance (MoCA) interface, a reduced gigabit media independent interface (RGMII), or generally any interface for connecting to a network. In this manner, electronic system 700 can be a part of one or more networks of computers (such as a local area network (LAN), a wide area network (WAN), or an Intranet, or a network of networks, such as the Internet. Any or all components of electronic system 700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device, comprising:
   at least one processor circuit configured to:
      identify a pairable device within an area;
      determine a pairing status of the pairable device;
      provide, for display, a graphical representation of the area and the pairable device, the graphical representation further comprising an indication of the pairing status of the pairable device, and the graphical representation having been generated at least in part by another device based at least in part on information that was captured from the area by the another device; and
      responsive to a selection of the pairable device, provide, for display overlaid on the graphical representation, a list of services provided by the pairable device, the list of services being displayed separately from the indication of the pairing status.

2. The device of claim 1, wherein the at least one processor circuit is further configured to:
   provide, for display, the graphical representation such that the pairable device is depicted within the graphical representation at a location that coincides with a physical location of the pairable device within the area.

3. The device of claim 1, wherein the at least one processor circuit is further configured to receive the graphical representation from another device over a network connection.

4. The device of claim 3, wherein the graphical representation comprises a map of the area, and wherein the at least one processor circuit is further configured to
   identify a depiction of the pairable device within the graphical representation of the area.

5. The device of claim 1, further comprising:
   an image capture device that is configured to capture an image corresponding to the area; and
   wherein the at least one processor circuit is further configured to:
      identify a portion of the captured image corresponding to the pairable device, wherein the graphical representation of the area and the pairable device comprises the image; and
      provide, for display, the image that includes the pairable device with the indication of the pairing status of the pairable device.

6. The device of claim 5, wherein the indication comprises a first graphical attribute overlaid on the portion of the captured image corresponding to the pairable device when the pairing status indicates that the pairable device is paired with the device and a second graphical attribute overlaid on the portion of the captured image corresponding to the pairable device when the pairing status indicates that the pairable device is not paired with the device, the first graphical attribute being visually distinctive from the second graphical attribute.

7. The device of claim 1, wherein the at least one processor circuit is further configured to
   identify the pairable device based at least in part on a signal transmitted by the pairable device, wherein the signal comprises information identifying the pairable device.

8. The device of claim 1, wherein the device further comprises:
   a memory that is configured to store information related to the area or pairable device; and
   wherein the at least one processor circuit is further configured to:
      identify the pairable device based at least in part on the stored information.

9. The device of claim 1, wherein the at least one processor circuit is further configured to:
   receive input provided by a user; and
   identify the pairable device based at least on the input provided by the user.

10. The device of claim 1, wherein the at least one processor circuit is further configured to:
    provide, responsive to the selection of the pairable device, at least one of: an opportunity to initiate pairing or unpairing of the pairable device to the device, or device status information corresponding to the pairable device.

11. The device of claim 1, wherein the at least one processor circuit is further configured to:
    receive another selection of one of the services; and
    initiate performance of the one of the services by the pairable device.

12. The device of claim 1, wherein the at least one processor circuit is further configured to:
    identify another pairable device within the area;
    provide, for display, the graphical representation of the area, the pairable device, and the another pairable device, wherein the graphical representation indicates another pairing status associated with the another pairable device that indicates that the another pairable device is pairable with the pairable device;
    receive a request to pair the pairable device with the another pairable device; and
    initiate pairing of the pairable device with the another pairable device.

13. The device of claim 1, wherein the at least one processor circuit is further configured to:
    receive another selection of the pairable device from the graphical representation of the area and the pairable device;
    pair with the pairable device;
    receive information from the pairable device that relates to other pairable devices in the area; and
    pair with the other pairable devices in the area based at least in part on the received information.

14. A method, comprising:
    identifying a plurality of pairable devices within an area;
    receiving, over a network and from an external device, a graphical representation of the plurality of pairable devices and the area, the graphical representation having been generated by the external device based at least in part on information that was captured from the area by the external device;

providing, for display, the graphical representation of the plurality of pairable devices and the area; and performing an action related to at least one of the plurality of pairable devices in response to a selection thereof.

15. The method of claim 14, wherein the action comprises at least one of:

initiating pairing or unpairing of the one of the plurality of pairable devices;

providing a list of services provided by the one of the plurality of pairable devices; or providing device status information corresponding to the one of the plurality of pairable devices.

16. The method of claim 14, further comprising:

determining a pairing status of each of the plurality of pairable devices; and providing an indication of the pairing status of each of the plurality of pairable devices within the graphical representation of the plurality of pairable devices and the area.

17. The method of claim 14, wherein identifying the plurality of pairable devices within the area comprises:

receiving an image corresponding to the area;

comparing a plurality of reference device images to the image corresponding to the area; and matching one of the plurality of reference device images to at least a portion of the image corresponding to the area, wherein the at least the portion of the image corresponds to one of the plurality of pairable devices.

18. The method of claim 14, wherein identifying the plurality of pairable devices within the area comprises:

scanning for signals generated by the plurality of pairable devices within the area; and identifying a signal that comprises information identifying one of the plurality of pairable devices.

19. The method of claim 18, further comprising:

determining at least one service provided by the one of the plurality of pairable devices based at least in part on the identified signal; and providing an indication of the at least one service for display in conjunction with the graphical representation of the plurality of pairable devices and the area.

20. The method of claim 18, further comprising:

mapping a direction of the identified signal in the area based at least in part on a beamforming calculation, wherein the one of the plurality of pairable devices is represented within the graphical representation of the plurality of pairable devices at a location that coincides with the direction of the identified signal.

21. A computer program product comprising instructions stored in a non-transitory computer-readable storage medium, the instructions being executable by a processor and the instructions comprising:

instructions to receive a signal from a device that is physically located within a proximal area;

instructions to estimate a physical location of the device within the proximal area based at least in part on the received signal; and instructions to provide, for display, a graphical representation that virtually depicts the proximal area and the device, the device being depicted in the graphical representation at a location that coincides with the estimated physical location of the device within the proximal area, the graphical representation comprising a virtual three-dimensional map of the proximal area, and the graphical representation having been generated at least in part by another device based at least in part on information that was captured from the proximal area.

22. The computer program product of claim 21, wherein the instructions further comprise:

instructions to determine a direction of the received signal based at least in part on a beamforming calculation; and instructions to estimate the physical location of the device within the proximal area based at least in part on the beamforming calculation.

* * * * *